United States Patent
Schindhelm et al.

(10) Patent No.: US 10,090,785 B2
(45) Date of Patent: Oct. 2, 2018

(54) ELECTRIC ARRANGEMENT AND METHOD FOR CONTROLLING OF AT LEAST TWO ELECTRIC MOTORS

(71) Applicant: Brose Fahrzeugteile GmbH & Co. KG, Bamberg, Bamberg (DE)

(72) Inventors: Thomas Schindhelm, Neuhaus-Schierschnitz (DE); Stefan Franek, Großheirath (DE); Guido Naumann, Allendorf (DE); Christian Thomann, Burgebrach (DE)

(73) Assignee: Brose Fahrzeugtelle GMBH & Co. KG, Bamberg, Bamberg (DE)

( * ) Notice: Subject to any disclaimer, the term of this patent is extended or adjusted under 35 U.S.C. 154(b) by 0 days.

(21) Appl. No.: 15/293,206

(22) Filed: Oct. 13, 2016

(65) Prior Publication Data
US 2017/0117828 A1    Apr. 27, 2017

(30) Foreign Application Priority Data
Oct. 26, 2015   (DE) .......................... 10 2015 220 854

(51) Int. Cl.
*H02P 5/68*     (2006.01)
*H02P 6/04*     (2016.01)
(Continued)

(52) U.S. Cl.
CPC ...... *H02P 5/68* (2013.01); *B60J 1/12* (2013.01); *H02P 6/04* (2013.01); *H02P 7/04* (2016.02)

(58) Field of Classification Search
CPC ..................................... H02P 5/68; H02P 7/04
See application file for complete search history.

(56) References Cited

U.S. PATENT DOCUMENTS

| 4,638,222 A | 1/1987 | Sawaki |
| 4,670,693 A * | 6/1987 | Kazami .................. H02P 5/685 |
| | | 318/112 |

(Continued)

FOREIGN PATENT DOCUMENTS

| DE | 35 29 033 A1 | 2/1986 |
| DE | 10 2010 026 656 A1 | 3/2011 |

(Continued)

OTHER PUBLICATIONS

JP Office action dated Jan. 23, 2018 cited in corresponding Japanese Patent Application No. 2016-207975, 4 pages.

(Continued)

*Primary Examiner* — Muhammad S Islam
(74) *Attorney, Agent, or Firm* — Lewis Roca Rothgerber Christie LLP

(57) ABSTRACT

An electric arrangement which, for controlling at least two electric motors, has at least one first H-bridge arrangement and a second H-bridge arrangement, is provided. The electric arrangement comprises a first electric motor, which is electrically connected to a first switching element, a second switching element, a third switching element and a fourth switching element in the first H-bridge arrangement. The electric arrangement furthermore comprises a second electric motor, which is arranged in a second bridge branch of the second H-bridge arrangement) and is connected to a third half-bridge via a third motor contact, wherein the third half-bridge comprises a fifth switching element and a sixth switching element.

19 Claims, 4 Drawing Sheets

(51) Int. Cl.
*H02P 7/03* (2016.01)
*B60J 1/12* (2006.01)

(56) References Cited

U.S. PATENT DOCUMENTS

| | | | | |
|---|---|---|---|---|
| 2002/0105295 | A1* | 8/2002 | Cregeur | E05F 15/689 |
| | | | | 318/283 |
| 2002/0117980 | A1* | 8/2002 | Echols | H02P 5/00 |
| | | | | 318/34 |
| 2004/0085033 | A1* | 5/2004 | Bliley | H02P 5/68 |
| | | | | 318/106 |
| 2004/0245954 | A1 | 12/2004 | Moench et al. | |
| 2004/0257022 | A1 | 12/2004 | Trifilo | |
| 2011/0044669 | A1* | 2/2011 | Leon | E05F 15/622 |
| | | | | 388/829 |
| 2012/0285086 | A1* | 11/2012 | Boisvert | B60J 7/0573 |
| | | | | 49/25 |
| 2013/0228402 | A1 | 9/2013 | Leibfried et al. | |

FOREIGN PATENT DOCUMENTS

| | | |
|---|---|---|
| FR | 2 924 874 | 6/2009 |
| JP | 10-14285 A | 1/1998 |
| JP | 2006-506262 | 2/2006 |
| JP | 2011-507469 | 3/2011 |
| JP | 2013-027278 | 2/2013 |

OTHER PUBLICATIONS

European Search Report dated Aug. 8, 2017, Application No. 16194374.1-1812/3163740, 9 pages.

\* cited by examiner

ELECTRIC ARRANGEMENT AND METHOD FOR CONTROLLING OF AT LEAST TWO ELECTRIC MOTORS

CROSS-REFERENCE TO A RELATED APPLICATION

This application claims priority to German Patent Application No. 10 2015 220 854.0 filed on Oct. 26, 2015, the entirety of which is incorporated by reference herein.

BACKGROUND

The invention relates to an electric arrangement and to a method for controlling at least two electric motors.

Such an electric arrangement, for controlling at least two electric motors, has at least one first H-bridge arrangement (also referred to as full-bridge arrangement) and a second H-bridge arrangement and comprises a first electric motor, which is electrically connected to a first switching element, a second switching element, a third switching element and a fourth switching element in the first H-bridge arrangement. In this case, the first electric motor is arranged in a first bridge branch of the first H-bridge arrangement. The first electric motor can be for example an adjusting motor of a window winding device of a motor vehicle. In the context of the electric arrangement, for example, said motor can be controlled by means of pulse width modulation and for this purpose can be interconnected with the first, second, third and fourth switching elements in the H-bridge arrangement.

The switching elements can be for example semiconductor transistors, in particular MOSFETs and/or or IGBTs.

In this case, the first electric motor is connected to a first half-bridge via a first motor contact, wherein the first half-bridge comprises the first switching element and the second switching element. In addition, the first electric motor is connected to a second half-bridge via a second motor contact, said second half-bridge comprising the third switching element and the fourth switching element.

Furthermore, the electric arrangement comprises at least one second electric motor arranged in a second bridge branch of the second H-bridge arrangement. In this case, the second electric motor is connected to a third half-bridge via a third motor contact, said third half-bridge comprising a fifth switching element and a sixth switching element.

The second electric motor can be for example a second adjusting motor of a window winding device in a motor vehicle. In this regard, the first adjusting motor can be arranged for example for adjusting a windowpane of a left vehicle door, and the second electric motor can be arranged for adjusting a windowpane of a right vehicle door. Furthermore, the first adjusting motor can be arranged for example for adjusting a windowpane of a front vehicle door, while the second electric motor can be arranged for adjusting a windowpane of a rear vehicle door. In this case, a user may desire to control the two electric motors in such a way that the windowpane at the left or front vehicle door is raised, while the windowpane at the right or rear vehicle door is lowered, or vice versa.

It is known, in an electric arrangement of the type described in the introduction, to provide two separate H-bridge arrangements for controlling the first electric motor, on the one hand, and the second electric motor, on the other hand. Accordingly, the second electric motor is connected by a fourth motor contact to a fourth half-bridge comprising a seventh switching element and an eighth switching element. What is disadvantageous in the case of the previously known solution is that a total of at least eight switching elements are required for controlling two electric motors. It should be taken into consideration here that each switching element firstly per se is associated with costs and weight and secondly takes up valuable structural space, for example on a printed circuit board.

SUMMARY

The invention is based on the object of improving an electric arrangement of the type mentioned in the introduction with regard to its production costs, its weight and/or the required structural space.

This object is achieved according to the invention by means of an electric arrangement as described herein and by means of a method as described herein.

Accordingly, the second electric motor is connected to the first half-bridge via a fourth motor contact in such a way that it is electrically connected to the first switching element, the second switching element, the fifth switching element and the sixth switching element in the second H-bridge arrangement. In this way, the first half-bridge on the one hand together with the second half-bridge forms the first H-bridge arrangement comprising the first electric motor in the first bridge branch, and on the other hand together with the third half-bridge forms the second H-bridge arrangement comprising the second electric motor arranged in the second bridge branch. Consequently, the first half-bridge forms simultaneously in each case a part of the first H-bridge arrangement and of the second H-bridge arrangement.

The electric arrangement according to the invention enables the first electric motor and the second electric motor to be controlled independently. In this case, the electric arrangement manages with a total of only six switching elements, thereby saving two switching elements in comparison with previously known solutions. The production costs of an electric arrangement for independently controlling two electric motors, for example two adjusting motors of a window winding device for a motor vehicle, can be reduced in this way. Moreover, by saving two switching elements, weight can be saved, and valuable structural space, for example on a printed circuit board, can be utilized in a different way or be saved.

In one preferred embodiment of the electric arrangement according to the invention, each of the switching elements is switchable into a closed state and into an open state depending on a respective control signal. In this case, the open state should be understood to mean a state in which the switching element is designed, at least in a forward direction, to block a voltage and to conduct no or substantially no current. By contrast, in the closed state the switching element is able to conduct a current in the forward direction comparatively well.

In particular, the switching elements can comprise at least one semiconductor transistor, for example a MOSFET or some other field effect transistor (FET). In this case, the open state can correspond to a high-impedance state and the closed state can correspond to a comparatively low-impedance state of the MOSFET. A gate voltage present at a gate terminal of the MOSFET as control signal can bring about a switchover from the open state into the closed state, or vice versa. In this case, it is also conceivable for the switching elements to comprise at least one bipolar semiconductor transistor, in particular an IGBT. In this case, too, a switchover from a blocking open state into a conducting closed state of the IGBT, or vice versa, can be brought about by a control signal in the form of a gate voltage.

In accordance with one development, the electric arrangement comprises at least one control unit configured for generating the control signals for the switching elements depending on a desired direction of rotation and/or rotational speed of the first electric motor and/or of the second electric motor. Such a control unit can be a microcontroller, for example, the outputs of which for communicating the control signals are connected in each case to assigned control terminals of the switching elements. By way of example, such a microcontroller can receive signals via signal inputs from operating elements actuated by a user for this purpose, said signals corresponding to a desired direction of rotation and/or rotational speed for each electric motor. Said signals can be translated into corresponding control signals by the microcontroller for controlling the electric motors, in particular by means of pulse width modulation, said control signals being output to the control terminals of the switching elements.

In one preferred embodiment, the first electric motor and/or the second electric motor are/is a DC motor. DC motors are suitable for controlling by means of the H-bridge arrangement according to the invention, in particular by a method of pulse width modulation. Adjusting motors, for example on a window winding device for a motor vehicle, can be embodied as DC motors.

It lies within the scope of the invention that the first electric motor is drivable in one direction of rotation by a current flow from the first motor contact to the second motor contact and in an opposite direction of rotation by a current flow from the second motor contact to the first motor contact. Correspondingly, the second electric motor can be drivable in one direction of rotation by a current flow from the third motor contact to the fourth motor contact and in an opposite direction of rotation by a current flow from the fourth motor contact to the third motor contact. By way of example, a DC motor as first electric motor can be arranged in the electric arrangement according to the invention in such a way it is driven to clockwise rotation by a current flow from the first motor contact to the second motor contact, whereas it is driven to counterclockwise rotation by an opposite current flow from the second motor contact to the first motor contact (or vice versa). The same correspondingly applies to the second electric motor.

In a second aspect of the invention, an electric window winding device for a motor vehicle comprising at least one first adjusting motor for adjusting a first windowpane and at least one second adjusting motor for adjusting a second windowpane is proposed. In this case, the electric window winding device comprises at least one electric arrangement according to the invention comprising the at least one first adjusting motor as first electric motor and comprising the at least one second adjusting motor as second electric motor. By means of the electric arrangement, both adjusting motors can be controlled independently of one another in such a way that, for example, only one of the windowpanes is raised or lowered into a, that both windowpanes are simultaneously raised or lowered into the, or that one of the windowpanes is raised and at the same time the other windowpane is lowered.

A third aspect of the invention relates to a method for controlling at least two electric motors, in particular by means of pulse width modulation. An electric arrangement which, for controlling the electric motors, has at least one first H-bridge arrangement and a second H-bridge arrangement is used in this case. The electric arrangement comprises a first electric motor, which is arranged in a first bridge branch of a first H-bridge arrangement and is electrically connected to a first half-bridge and a second half-bridge in the first H-bridge arrangement. In addition, the electric arrangement comprises a second electric motor, which is arranged in a second bridge branch of a second H-bridge arrangement and is electrically connected to the first half-bridge and a third half-bridge in the second H-bridge arrangement. In this case, the first half-bridge is simultaneously part of the first H-bridge arrangement and of the second H-bridge arrangement. In this case, each of the half-bridges comprises at least two switching elements.

In the method according to the invention, the first electric motor is controlled by the switching of the switching elements of the first half-bridge and of the second half-bridge. Additionally or alternatively, the second electric motor can be controlled by the switching of the switching elements of the first half-bridge and of the third half-bridge.

In particular, an electric arrangement in accordance with the first aspect of the invention and/or in accordance with the second aspect of the invention can be used in the context of the method according to the invention for controlling the electric motors. Accordingly, in the context of this disclosure, features explained in association with the electric arrangement according to the invention or the electric window winding device according to the invention likewise relate to the device used in the method according to the invention, and vice versa.

In one preferred embodiment, the half-bridges can be electrically connected to a first supply terminal and to a second supply terminal. In this way, for example, a supply voltage or the electric motors can be applied between the first supply terminal and the second supply terminal. Furthermore, the half-bridges can be switchable in each case into a first half-bridge position, into a second half-bridge position and into a third half-bridge position. In this case, in the first half-bridge position that one of the switching elements which is arranged within the respective half-bridge in an electric path between the first supply terminal and the respective other one of the switching elements is closed, while the other one of the switching elements is open. By contrast, in the second half-bridge position that one of the switching elements which is arranged within the respective half-bridge in an electric path between the second supply terminal and the respective other one of the switching elements is closed, the other one of the switching elements being open. In the third half-bridge position the switching elements of the respective half-bridge are open. It goes without saying that, in principle, further electrical components, for example diodes or resistors, can be arranged in the relevant electric paths.

In order to control the electric motors, the first half-bridge, in a first switching sequence, can be switched periodically into the first half-bridge position for a first pulse duration and into the second half-bridge position for a second pulse duration. In this case, additionally the second half-bridge and/or the third half-bridge are/is switched depending on the electric motor to be controlled.

In this regard, the second half-bridge, in a second switching sequence, can be switched between the first half-bridge position, the second half-bridge position and/or the third half-bridge position in order to control the first electric motor. In order to control the second electric motor, the third half-bridge, in a third switching sequence, can be switched between the first half-bridge position, the second half-bridge position and/or the third half-bridge position. In this case, the second and third switching sequences can depend on the desired direction of rotation and/or rotational speed of the first and/or second electric motor. The choice of suitable second and third switching sequences enables independent controlling of the first electric motor, on the one hand, and of the second electric motor, on the other hand, with regard to their direction of rotation and rotational speed.

In one variant, in order to control the first electric motor in such a way that it is driven in one direction of rotation, the second half-bridge is switched into its second half-bridge position for a plurality of period durations of the first switching sequence. In addition or as an alternative thereto, the second half-bridge can be switched into its first half-bridge position for a plurality of period durations of the first switching sequence in order to drive the first electric motor in an opposite direction of rotation. Correspondingly, the third half-bridge can be switched into its first half-bridge position for a plurality of period durations of the first switching sequence in order to drive the second electric motor in one direction of rotation, and/or can be switched into its second half-bridge position for a plurality of period durations of the first switching sequence in order to drive the second electric motor in an opposite direction of rotation.

Relative to a predefined first switching sequence of the first half-bridge, a maximum possible rotational speed of the respective electric motor can be achieved with this variant since the respective pulse durations of the first switching sequence are utilized completely as supply phases for the drive of the electric motors.

It is also possible, however, to set a rotational speed independently for each electric motor. For this purpose, for example, in order to drive the first electric motor in one direction of rotation the second half-bridge can be switched periodically into its second half-bridge position, such that the second half-bridge adopts the second half-bridge position at least for a third pulse duration, during which the first half-bridge is in its first half-bridge position. Alternatively or additionally, the second half-bridge, in order to drive the first electric motor in an opposite direction of rotation, can be switched periodically into its first half-bridge position and adopt the latter in each case at least for a fourth pulse duration, during which the first half-bridge is in its second half-bridge position.

Correspondingly, the third half-bridge, in order to drive the second electric motor in one direction of rotation, can be switched periodically into its first half-bridge position, such that the third half-bridge adopts the first half-bridge position in each case at least for a fifth pulse duration, during which the first half-bridge is in its second half-bridge position. Alternatively or additionally, the third half-bridge, in order to drive the second electric motor in an opposite direction of rotation, can be switched periodically into its second half-bridge position and remain in the latter in each case at least for a sixth pulse duration, during which the first half-bridge is in its first half-bridge position.

In order to enable an active freewheeling between the phases in which the respective electric motor is driven by a current flow between the supply terminals, particular precautions can be taken in the context of the second and third switching sequences. If the switching elements are MOSFETs, for example, it may be expedient to switch on individual MOSFETS occasionally, in order that a freewheeling current can flow through them in the reverse direction with the least losses possible.

For this purpose, the second half-bridge and/or the third half-bridge can be switched periodically into the first half-bridge position thereof and adopt the latter while the first half-bridge is in its first half-bridge position. In other words, provision can be made for there to be a temporal overlap between the first half-bridge position of the second half-bridge and/or of the third half-bridge, on the one hand, and the first half-bridge position of the first half-bridge. Alternatively or additionally, the second half-bridge and/or the third half-bridge can be switched periodically into the second half-bridge position thereof and adopt the latter while the first half-bridge is in its second half-bridge position, such that there is a temporal overlap between the second half-bridge position of the second half-bridge and/or of the third half-bridge, on the one hand, and the second half-bridge position of the first half-bridge, on the other hand.

In accordance with one variant, a rotational speed of the first electric motor is controlled by setting a ratio of the third pulse duration and/or of the fourth pulse duration to a period duration of the first switching sequence, wherein additionally or alternatively a rotational speed of the second electric motor can be controlled by setting a ratio of the fifth pulse duration and/or of the sixth pulse duration to the period duration of the first switching sequence. An independent control of the first electric motor and of the second electric motor by means of pulse width modulation is made possible in this way.

Preferably, within the first switching sequence the first pulse duration and the second pulse duration are substantially of the same length. In other words, in one preferred embodiment, a ratio of the first pulse duration to the second pulse duration can be, in particular, in the range of 0.9 to 1.1. In this way, it is possible to ensure in a simple manner that the first switching sequence does not go out of phase with the second and/or third switching sequence.

A ratio of the first pulse duration to a period duration of the first switching sequence and/or a ratio of the second pulse duration to the period duration of the first switching sequence can preferably be in each case in the range of 0.4 to 0.6. In particular, the ratio of the first pulse duration to the period duration of the first switching sequence and/or the ratio of the second pulse duration to the period duration of the first switching sequence can be substantially 0.5. In this way, a supply voltage that is as high as possible is provided for the electric motors on average over time.

It also lies within the scope of the invention that, for switching over the half-bridges from their respective first half-bridge position into their respective second half-bridge position, the respective half-bridge is firstly switched from its first half-bridge position into its third half-bridge position and is subsequently switched from its third half-bridge position into its second half-bridge position. Correspondingly, for switching over the half-bridges from their respective second half-bridge position into their respective first half-bridge position, the respective half-bridge can firstly be switched from its second half-bridge position into its third half-bridge position and subsequently be switched from its third half-bridge position into its first half-bridge position. Half-bridge short circuits can be avoided by means of such a switching offset when switching over between the first half-bridge position and the second half-bridge position, or vice versa.

BRIEF DESCRIPTION OF THE DRAWINGS

Further details and advantages of the invention will become clear in the following description of exemplary embodiments with reference to the figures.

DETAILED DESCRIPTION

Figure 1:
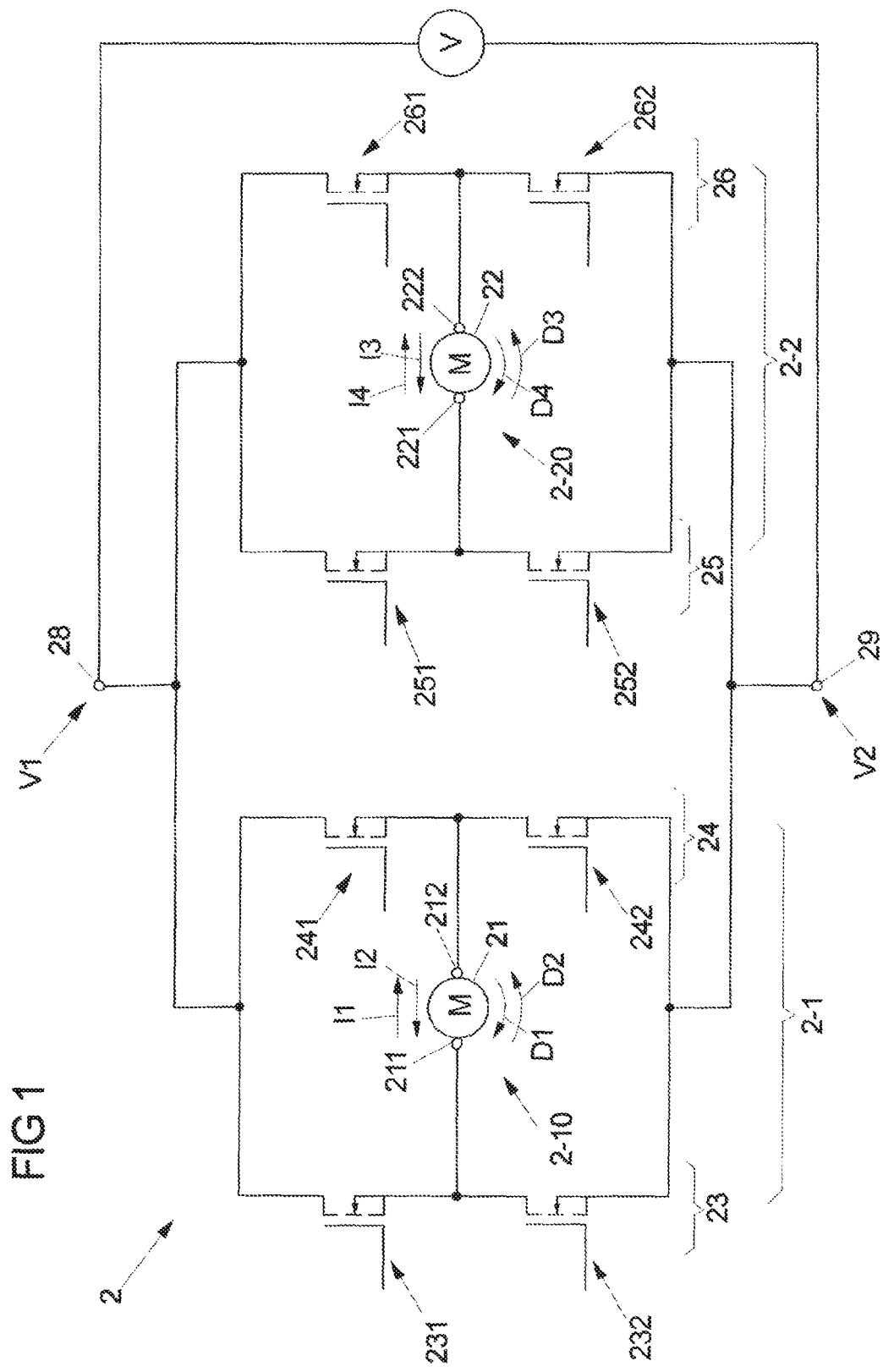
FIG. 1 shows an electric arrangement in accordance with the prior art.

FIG. 1 shows a conventional electric arrangement 2 for controlling two electric motors 21, 22. In order to enable independent controlling of the electric motors 21, 22 with regard to their direction D1, D2 of rotation and/or rotational speed, two separate H-bridge arrangements 2-1, 2-2 are provided in previously known solutions.

In this case, a first electric motor 21 is arranged in a first bridge branch 2-10 of a first H-bridge arrangement 2-1 in such a way that it is connected to a first half-bridge 23 via a first motor contact 211 and to a second half-bridge 24 via a second motor contact 212. The first half-bridge 2-1 comprises a first switching element 231 and a second switching element 232, wherein the first motor contact 211 is connected to an electric path between the first switching element 231 and the second switching element 232. Correspondingly, the second half-bridge 24 comprises a third switching element 241 and a fourth switching element 242, wherein the second motor contact 212 is connected to an electric path between the third switching element 241 and the fourth switching element 242.

Analogously to the construction of the first H-bridge arrangement 2-1, a second electric motor 22 is electrically connected to a fifth switching element 251, a sixth switching element 252, a seventh switching element 261 and an eighth switching element 262 in a second H-bridge arrangement 2-2.

A first supply terminal 28 and a second supply terminal 29 are provided in order to provide a supply voltage V for the electric motors 21, 22. The first supply terminal 28 is connected to an electric path between the first switching element 231 and the third switching element 241 and also to an electric path between the fifth switching element 251 and the seventh switching element 261. The second supply terminal 29 is connected to an electric path between the second switching element 232 and the fourth switching element 242 and also to an electric path between the sixth switching element 252 and the eighth switching element 262. With regard to their linking to the supply terminals 28, 29, the first H-bridge arrangement 2-1 and the second H-bridge arrangement 2-2 are thus connected in parallel.

In the embodiment of a previously known electric arrangement 2 as illustrated in FIG. 1, the switching elements 231, 232, 241, 242, 251, 252, 261, 262 are MOSFETs, which are switchable into a closed state and into an open state in each case by means of an external gate voltage signal. In this case, the open state corresponds to a high-impedance state in which the respective MOSFET is not or substantially not conductive in a forward direction between a source terminal and a drain terminal and is designed for blocking an external voltage in the forward direction. By contrast, the MOSFETs in their respective closed state exhibit comparatively good conductivity in the forward direction.

By means of suitable switching of the switching elements 231, 232, 241, 242, 251, 252, 261, 262, the first electric motor 21 and the second electric motor 22 can be driven in each case in a desired direction D1, D2 of rotation, wherein a rotational speed of the respective electric motor 21, 22 is additionally settable by means of pulse width modulation. By way of example, if a potential V1 that is higher than a potential V2 present at the second supply terminal 29 is present at the first supply terminal 28, then the first electric motor 21 is driven by a current flow I1 from the first motor contact 211 to the second motor contact 212 if the first switching element 231 and the fourth switching element 242 are simultaneously closed while the second switching element 232 and the third switching element 241 are open. As a result, the first electric motor 21 can be driven in one direction D1 of rotation, for example to clockwise rotation.

In this case, a rotational speed of the first electric motor 21 rotating clockwise is settable by means of pulse width modulation by virtue of the first switching element 231 and/or the fourth switching element 242 being periodically closed and opened. A resulting rotational speed of the first electric motor 21 rotating clockwise is all the greater, the greater a ratio of a pulse duration during which the first switching element 231 and/or the fourth switching element 242 are/is closed to a period duration of the change between the closed state and the open state of the first switching element 231 and/or of the fourth switching element 242.

In order to drive the first electric motor 21 to counter-clockwise rotation, the second switching element 232 and the third switching element 241 are closed and opened in each case simultaneously in a periodic alternation, while the first switching element 213 and the fourth switching element 242 are open. If the second switching element 232 and the third switching element 241 are closed, a second current flow I2 from the second motor contact 212 to the first motor contact 211 drives the first electric motor 21 to counter-clockwise rotation in an opposite direction D2 of rotation. In this case, a rotational speed of the first electric motor 21 rotating counterclockwise can in turn be set by means of pulse width modulation.

The second electric motor 22 is controllable independently of the first electric motor 21 with regard to a desired direction D1, D2 of rotation and/or rotational speed in a corresponding manner by suitable switching of the switching elements 251, 252, 261, 262 of the second H-bridge arrangement 2-2.

Figure 2:
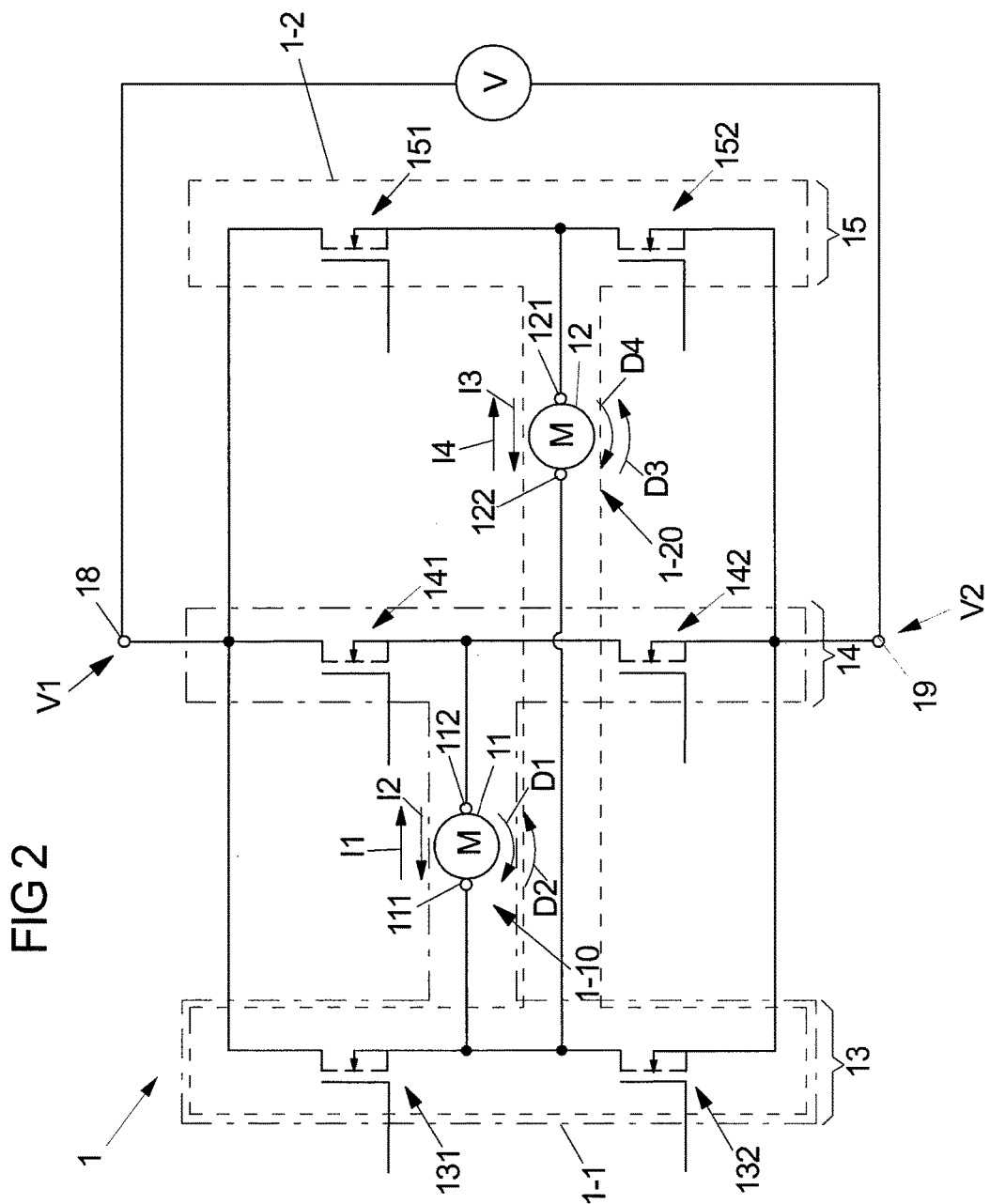
FIG. 2 shows an electric arrangement according to the invention.

FIG. 2 illustrates an electric arrangement 1 according to the invention for independently controlling two electric motors 11, 12. The electric motors 11, 12 can be DC motors, for example, which are used as adjusting motors for a respective windowpane in an electric window winding device of a motor vehicle. In this case, it may be necessary to control the electric motors 11, 12 independently of one another with regard to their direction D1, D2, D3, D4 of rotation and/or rotational speed in order to raise and/or lower both windowpanes independently of one another.

The electric arrangement 1 comprises a first H-bridge arrangement 1-1, which substantially corresponds to the first H-bridge arrangement 2-1 from FIG. 1. In this regard, a first electric motor 11 is electrically connected to a first switching element 131, a second switching element 132, a third switching element 141 and a fourth switching element 142 in the first H-bridge arrangement 1-1, wherein the first electric motor 11 is arranged in a first bridge branch 1-10 of the first H-bridge arrangement 1-1. The first electric motor 11 is connected to a first half-bridge 13 via a first motor contact 111 and to a second half-bridge 14 via a second motor contact 112, wherein the first half-bridge 13 comprises the first switching element 131 and the second switching element 132, and wherein the second half-bridge 14 comprises the third switching element 141 and the fourth switching element 142. In this case, the first motor contact 111 is connected to an electric path between the first switching element 131 and the second switching element 132, and the second motor contact 112 is connected to an electric path between the third switching element 141 and the fourth switching element 142.

Furthermore, a second electric motor 12 is connected to a third half-bridge 15 via a third motor contact 121, said third half-bridge comprising a fifth switching element 151 and a sixth switching element 152. In this case, the third motor contact 121 is connected to an electric path between the fifth switching element 151 and the sixth switching element 152. In addition, the second electric motor 12 is connected to the first half-bridge 13 via a fourth motor contact 122 in such a way that it is electrically connected to the first switching element 131, the second switching element 132, the fifth switching element 151 and the sixth switching element 152 in a second H-bridge arrangement 1-2. As shown in FIG. 2, the fourth motor contact 122 for this purpose is connected to an electric path between the first switching element 131 and the second switching element 132.

The second H-bridge arrangement 1-2, in the second bridge branch 1-20 of which the second electric motor 12 is arranged, accordingly shares the first half-bridge 13 with the first H-bridge arrangement 1-1, which supplies the first electric motor 11. In other words, the first half-bridge 13 on the one hand together with the second half-bridge 14 and the first bridge branch 1-10 forms the first H-bridge arrangement 1-1, and on the other hand together with the third half-bridge 15 and the second bridge branch 1-20 forms the second H-bridge arrangement 1-2. Overall, therefore, two functional H-bridge arrangements 1-1, 1-2 (reference sign 1-2 is absent in FIGS. 2 and 3) are provided, by means of which the first electric motor 11 and the second electric motor 12 are controllable independently of one another.

In this case, the electric arrangement 1 according to the invention manages with only six different switching elements 131, 132, 141, 142, 151, 152 and thus saves two switching elements in comparison with the previously known solution shown in FIG. 1. The production costs of an electric arrangement 1 for independently controlling two electric motors 11, 12 for example two adjusting motors of a window winding device for a motor vehicle, can be reduced in this way. Moreover, by saving two switching elements, weight can be saved, and valuable structural space, for example on a printed circuit board, can be utilized in a different way.

In the exemplary embodiment in FIG. 2, the switching elements 131, 132, 141, 142, 151, 152 are MOSFETs. In further embodiments, the switching elements 133, 132, 141, 142, 151, 152 can comprise other semiconductor transistors, for example bipolar transistors and, in particular, IGBTs. Preferably, each of the switching elements 131, 132, 141, 142, 151, 152 is switchable into a closed state and into an open state depending on a respective control signal VG1, VG2, VG3, VG4, VG5, VG6.

Figure 3:
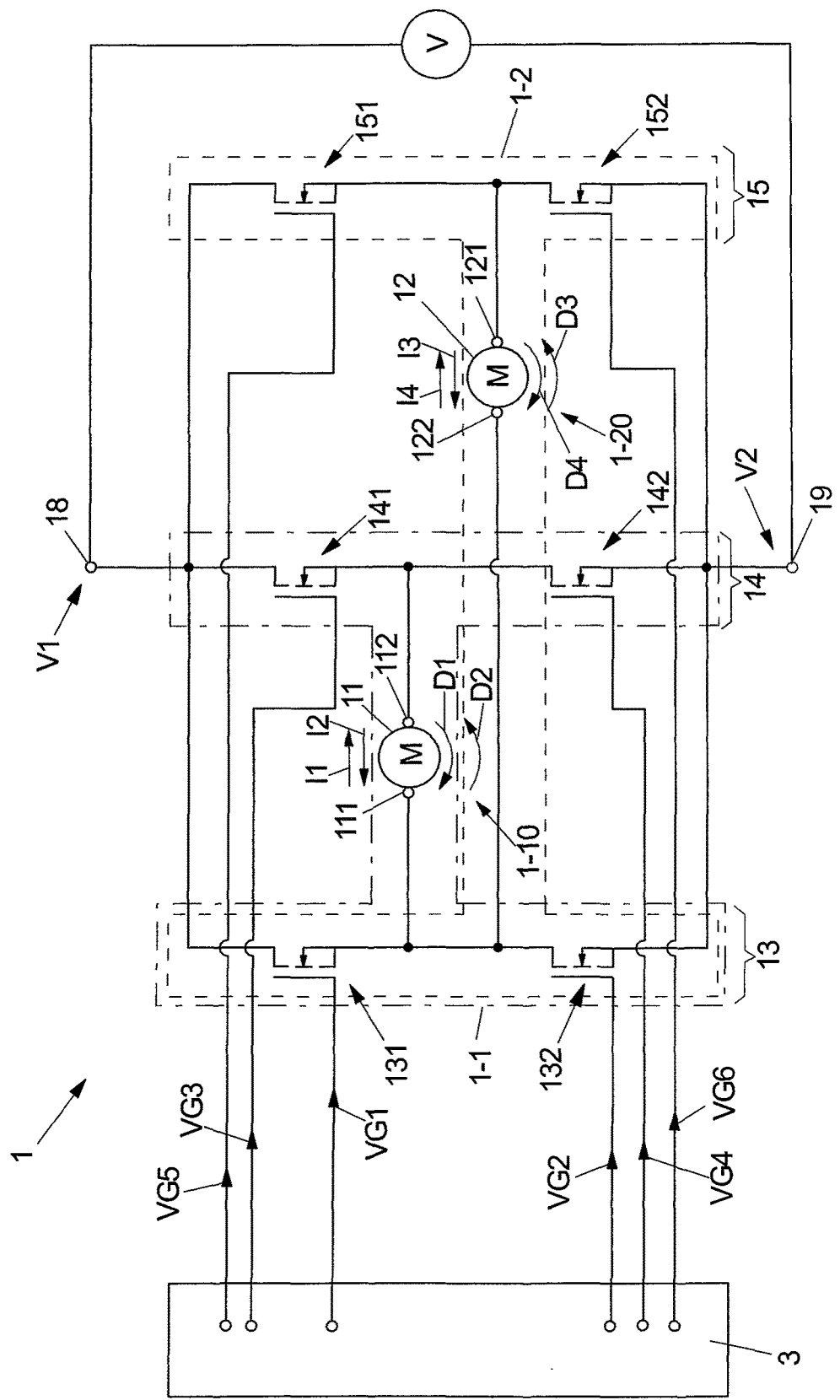
FIG. 3 shows the electric arrangement according to FIG. 2 with a control unit for generating control signals for the switching elements.

FIG. 3 shows the electric arrangement from FIG. 2, wherein provision is additionally made of a control unit 3 for generating the control signals VG1, VG2, VG3, VG4, VG5, VG6 for the switching elements 131, 132, 141, 142, 151, 152. The control unit 3 can be a microcontroller, for example, which provides the control signals VG1, VG2, VG3, VG4, VG5, VG6 depending on a respective desired direction D1, D2, D3, D4 of rotation and/or rotational speed for each electric motor 11, 12. In this case, the control unit 3 can calculate the control signals VG1, VG2, VG3, VG4, VG5, VG6 for example from input signals generated by at least one operating element of an electric window winding device.

By way of example, the first electric motor 11 can be an adjusting motor for adjusting a first windowpane at a first vehicle door and the second electric motor 12 can be an adjusting motor for adjusting a second windowpane at a second vehicle door. In this case, by means of one or more operating elements arranged for example in the interior of the motor vehicle, a user can control the adjusting motors 11, 12 independently of one another via the electric arrangement 1. By way of example, the first adjusting motor 11 can be driven in the direction D1 of rotation and thereby raise the first windowpane. Alternatively, the first adjusting motor 11 can be driven in the opposite direction D2 of rotation in order to lower the first windowpane. In this case, the first electric motor 11 can be driven in the direction D1 of rotation by a current flow I1 from the first motor contact 111 to the second motor contact 112, and it can be driven in the opposite direction D2 of rotation by an opposite current flow I2 from the second motor contact 112 to the first motor contact 111. The first electric motor 11 and/or the second electric motor 12 can be for example a DC motor.

At the same time as the driving of the first electric motor 11 in the direction D1 of rotation and/or or in the opposite direction D2 of rotation, the second electric motor 12, for example for lowering the windowpane, can be driven in one direction D3 of rotation by a current flow I3 from the third motor contact 121 to the fourth motor contact 122. As an alternative thereto, the second electric motor 12, for example for raising the second windowpane, can be driven in an opposite direction D4 of rotation by a current flow I4 from the fourth motor contact 122 to the third motor contact 121.

In this case, the electric arrangement 1 also enables a rotational speed of the respective electric motor 11, 12 to be set independently by means of pulse width modulation.

The independent controlling of the two electric motors 11, 12 by means of the electric arrangement from FIGS. 2 and 3 is described in greater detail below.

The half-bridges 11, 12, 13 of the electric arrangement 1 are switchable in each case into a first half-bridge position 13-1, 14-1, 15-1, into a second half-bridge position 13-2, 14-2, 15-2 and into a third half-bridge position 13-2, 14-2, 15-2. In this case, in the first half-bridge position 13-1, 14-1, 15-1 that one of the switching elements 131, 141, 151 which is arranged within the respective half-bridge 13, 14, 15 in an electric path between the first supply terminal 18 and the respective other one of the switching elements 132, 142, 152 is closed and the other one of the switching elements 132, 142, 152 is open.

A supply voltage V for the electric motors 11, 12 can be applied via a first supply terminal 18 and a second supply terminal 19, between which the half-bridges 13, 14, 15 are arranged in a parallel connection. By way of example, a potential V1 present at the first supply terminal 18 can be higher than second potential V2 present at the second supply terminal 19. In this regard, the first supply terminal 18 can be connected to a positive pole of an automobile battery, for example, and the second supply terminal V2 can contact ground, for example. A difference between the first potential V1 and the second potential V2 forms the supply voltage V.

In this case, the first switching element 131, the third switching element 141 and the fifth switching element 151, which are arranged in the respective half-bridge 13, 14, 15 on a side facing the first supply terminal 18 and facing away from the second supply terminal 19, function as high-side switching elements. By contrast, the second switching element 132, the fourth switching element 142 and the sixth switching element 152, which are arranged on a side of the respective half-bridge 13, 14, 15 that faces away from the first supply terminal 18 and faces the second supply terminal 19, function as low-side switching elements. In this case, the switching elements 131, 132, 141, 142, 151, 152, which are embodied as MOSFETs in the exemplary embodiment, are configured and arranged in the half-bridges 13, 14, 15 in such a way that in their respective open state they can block the supply voltage V and in their respective closed state they can conduct a current in a forward direction from the first supply terminal 18 to the second supply terminal 19.

In the respective first half-bridge position 13-1, 14-1, 15-1, the high-side switching elements 131, 141, 151 are closed, whereas the low-side switching elements 132, 142, 152 are open. By contrast, in the second half-bridge position, that one of the switching elements 132, 142, 152 which is arranged within the respective half-bridge 13, 14, 15 in an electric path between the second supply terminal 19 and the respective other one of the switching elements 131, 141, 151 is closed, the other one of the switching elements 131, 141, 151 being open. In the exemplary embodiment, therefore, the respective low-side switching element 132, 142, 152 is closed in the second half-bridge position 13-2, 14-2, 15-2, whereas the respective high-side switching element 131, 141, 151 is open in the second half-bridge position 13-2, 14-2, 15-2.

In the third half-bridge position 13-3, 14-3, 15-3, both the high-side switching elements 131, 141, 151 and the low-side switching elements 132, 142, 152 of the respective half-bridge 13, 14, 15 are open. Consequently, each of the half-bridges 13, 14, 15 in its third half-bridge position 13-3, 14-3, 15-3 overall is in a high-impedance state.

FIGS. 4A-4H illustrate different switching sequences S1, S2, S3 for the three half-bridges 13, 14, 15, with which the two electric motors 11, 12 can be controlled independently of one another in order to bring about the above-described behavior with regard to the respective direction D1, D2, D3, D4 of rotation and/or the respective rotational speed. Here in each case there is a time t on an abscissa and the associated half-bridge position 13-1, 13-2, 13-3, 14-1, 14-2, 14-3, 15-1, 15-2, 15-3 on an ordinate. The switching sequences S1, S2, S3 can be realized for example by means of corresponding sequences of control signals VG1, VG2, VG3, VG4, VG5, VG6 for the switching elements 131, 132, 133, 134, 135, 136 which are provided by the control unit 3.

Figure 4A:
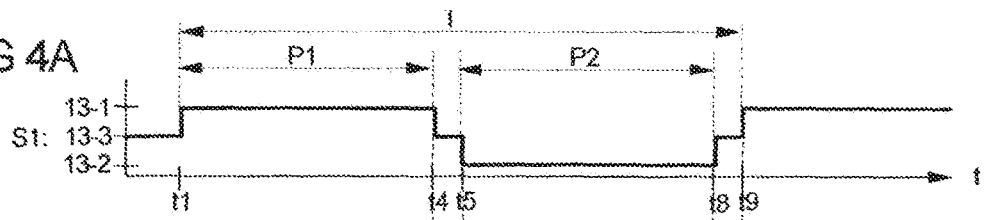
FIGS. 4A-H show switching sequences for the half-bridges of the electric arrangement for controlling the electric motors by means of pulse width modulation.

As illustrated in FIG. 4A, the first half-bridge 13, in a first switching sequence S1, is switched periodically into the first half-bridge position 13-1 for a pulse duration P1 and into the second half-bridge position 13-1 for a second pulse duration P2. In this case, a period duration T extending from the instant t1 to the instant t9 in FIG. 4A can correspond for example to a frequency of a few kilohertz.

In the exemplary embodiment illustrated, the first half-bridge 13, after the first pulse duration P1, is not directly switched from its first half-bridge position 13-1 into its second half-bridge position 13-2. Firstly, a switchover from the first half-bridge position 13-1 into the high-impedance third half-bridge position 13-3 takes place at the instant t4. It is only at an instant t5 that a switchover from the third half-bridge position 13-3 into the second half-bridge position 13-2 takes place. The comparatively short switching offset between the instants t4 and t5 in which the first half-bridge 13 adopts its high-impedance third half-bridge position 13-3 is provided in order to avoid a half-bridge short circuit. If exactly simultaneous opening of the first switching element 131, 132 and closing of the second switching element 132 were provided, then in practice there would be the risk of both switching elements 131, 132 of the first half-bridge 13 being momentarily closed at the same time. A corresponding switching offset is provided between the instants t8 and t9 when switching over the first half-bridge 13 from its second half-bridge position 13-2 into its first half-bridge position 13-1.

The first pulse duration P1 and the second pulse duration P2 are substantially of the same length in accordance with the exemplary embodiment in FIG. 4A, such that the first half-bridge 13 is in its first half-bridge position 13-1 and in its second half-bridge position 13-2 for approximately the same length of time during each period duration T. By way of example, a ratio of the first pulse duration P1 to the second pulse duration P2 can be in the range of 0.9 to 1.1. In this case, a ratio of the first pulse duration P1 to the period duration T and a ratio of the second pulse duration P2 to the period duration T can be in each case for example in the range of 0.4 to 0.6. In this case, the first half-bridge 13 is in the first half-bridge position 13-1 approximately for one half of each period duration T and in the second half-bridge position 13-2 approximately for the other half of each period duration T.

At the same time as the first switching sequence S1 of the first half-bridge 13, for controlling the first electric motor lithe second half-bridge 14 in a second switching sequence S2 and/or for controlling the second electric motor 12 the third half-bridge 15 in a third switching sequence S3 can be switched between the respective first half-bridge position 14-1, 15-1, the respective second half-bridge position 14-2, 15-2 and/or the respective third half-bridge position 14-3, 15-3. Possible switching sequences S2, S3 for the second half-bridge 14 and the third half-bridge 15 are illustrated by way of example in FIGS. 4B to 4H.

Figure 4B:
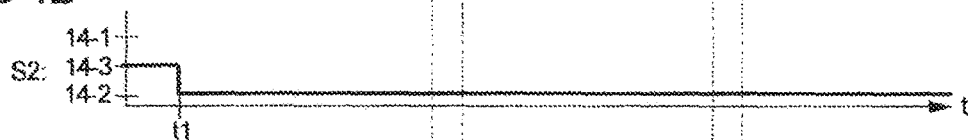

In the case of the second switching sequence S2 shown in FIG. 4B, the second half-bridge 14 is switched from its high-impedance third half-bridge position 14-3 into its second half-bridge position 14-2 at the instant t1 and remains in the second half-bridge position 14-2 over the entire period duration T. In particular, the second half-bridge 14 can remain in its second half-bridge position 14-2 for a plurality of period durations T of the first switching sequence S1 (not illustrated). Between the instants t1 and t4 and, if appropriate, between corresponding instants in the subsequent periods of the first switching sequence S1, the first switching element 131 as high-side switching element and the fourth switching element 142 as low-side switching element are simultaneously closed for the first pulse duration P1. In this case, owing to the supply voltage V, a current flow I1 from the first motor contact 111 to the second motor contact 112 drives the first electric motor 11 in the direction D1 of rotation. By contrast, the first switching element 131 is open from the instant t4 to the instant t9, wherein the third switching element 141 also remains open without change, such that the first electric motor 11 is isolated from the high-side potential V1 and is not driven by a current flow from the first supply terminal 18 to the second supply terminal 19.

Between the instants t4 and t9, however, as a result of self-induction at the first electric motor 11 the current flow I1 from the first motor contact 111 to the second motor contact 112 can be maintained at least partially as freewheeling current. In this case, the freewheeling current can flow in the clockwise direction in the circuit through the first bridge branch 1-10, through the fourth switching element 142, through the second switching element 132, and from there back to the first bridge branch 1-10. In this case, the freewheeling current flows through the second switching element 132 in a reverse direction. This can be made possible for example by an intrinsic backward diode of the MOSFET 132. In other embodiments, particularly if the switching elements 131, 132, 141, 142, 151, 152 are IGBTs, in order to enable a freewheeling current separate freewheeling diodes can be provided which are respectively connected in antiparallel with one of the switching elements 131, 132, 141, 142, 151, 152, and so a forward direction of the respective freewheeling diode corresponds to a reverse direction of the respective switching element 131, 132, 141, 142, 151, 152.

The second switching element 132 is closed from the instant t5 to the instant t8, such that an n-channel is formed owing to the gate voltage VG2 in the MOSFET 132. In this way, for the pulse duration P2 an active freewheeling is made possible in which the freewheeling current through the second switching element 132 does not have to overcome a threshold voltage of the intrinsic backward diode and hence can flow through in the reverse direction with lower losses than is the case between the instants t4 and t5 or between the instants t8 and t9.

As a result, through a combination of the first switching sequence S1 in accordance with FIG. 4A and the second switching sequence S2 in accordance with FIG. 4B, the first electric motor 11 is driven in the direction D1 of rotation by the current flow I1 substantially for half of the time.

Figure 4C:
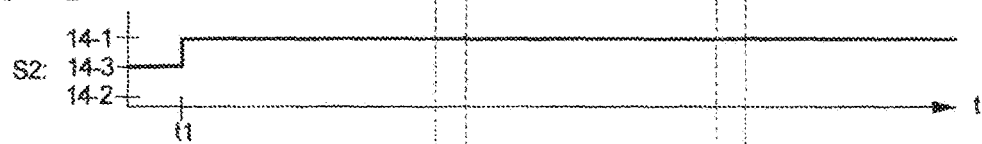

FIG. 4C shows an alternative second switching sequence S2, in which the second half-bridge 14 is switched from its third half-bridge position 14-3 into its first half-bridge position 14-1 at the instant t1 and subsequently remains in the first half-bridge position 14-1 at least over the entire period duration T. The low-side switching elements 132, 142 of the first half-bridge 13 and of the second half-bridge 14 are open between the instant t1 and the instant t5, such the first electric motor 11 is isolated from the low-side potential V2 and accordingly is not driven by a current flow from the first supply terminal 18 to the second supply terminal 19. By contrast, the second switching element 132 and the third switching element 141 are simultaneously closed during the second pulse duration P2, i.e. between the instant t5 and the instant t8, such that the first electric motor 11 is driven in the opposite direction D2 of rotation by a current flow I2 between the second motor contact 112 and the first motor contact 111. The driving of the first electric motor 11 in the opposite direction D2 of rotation is carried out here periodically with the period duration T in each case for the second pulse duration P2.

Between the second pulses P2, a freewheeling current can in each case circulate in the clockwise direction through the first bridge branch 1-10, the first switching element 131 and the third switching element 141. The closing of the first switching element 131 for the pulse duration P1 here in each case enables an active freewheeling.

Figure 4D:
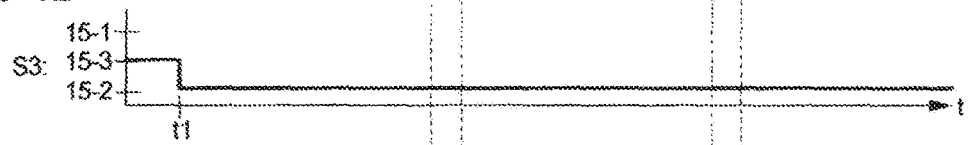
Figure 4E:
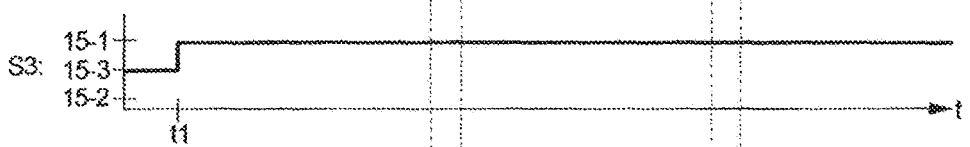

FIGS. 4D and 4E show two possible third switching sequences S3 for the third half-bridge 15, which are to be understood entirely analogously to the second switching sequences S2 for the second half-bridge 14 as explained above with reference to FIGS. 4B and 4C.

In this regard, the third half-bridge 15 is switched into its second half-bridge position 15-2 for a plurality of period durations T in the case of a combination of the first switching sequence S1 in accordance with FIG. 4A with the third switching sequence S3 in accordance with FIG. 4D. Between the instants t1 and t4 and between the respective corresponding instants of the subsequent periods (not illustrated) of the first switching sequence S1, the first switching element 131 and the sixth switching element 152 are simultaneously closed, such that the current flow I4 from the fourth motor contact 122 to the third motor contact 121 drives the second electric motor 12 actively in the opposite direction D4 of rotation for the pulse duration P1, i.e. approximately for half of each period duration T. Between the instants t4 and t9 and between the corresponding instants of the subsequent periods, a freewheeling current here can circulate in the clockwise direction through the second bridge branch 1-20, through the sixth switching element 152 and—in the reverse direction—through the second switching element 132. An active freewheeling can take place here between the instants t5 and t8 and between corresponding instants in the subsequent periods in each case for the second pulse duration P2.

As an alternative thereto, in accordance with FIG. 4E, for controlling the second electric motor 12 in such a way that it is driven in the direction D3 of rotation, the third half-bridge 15 is switched into its first half-bridge position 15-1 for a plurality of period durations T. The second switching element 132 and the fifth switching element 151 are simultaneously closed here between the instants t5 and t8 and between corresponding instants in the subsequent periods of the first switching sequence S1 in each case for the second pulse duration P2, such that a current flow I3 from the third motor contact 121 to the fourth motor contact 122 drives the second electric motor 12 in the direction D3 of rotation. Between these phases a freewheeling current can circulate in the clockwise direction through the second bridge branch 1-20, in the reverse direction through the first switching element 131 and the fifth switching element 151, an active freewheeling being made possible in each case for the first pulse duration P1 by the closing of the first switching element 113.

The second and third switching sequences S2, S3 according to FIGS. 4B to 4E bring about—relative to a predefined first switching sequence S1 in accordance with FIG. 4A—operation of the electric motors 11, 12 in their respective direction D1, D2, D3, D4 of rotation with a maximum possible rotational speed, since the respective pulse durations P1, P2 are utilized completely as supply phases for the drive of the electric motors 11, 12.

In order to set a respective rotational speed of the electric motors 11, 12, a method of pulse width modulation can be applied for the second switching sequence S2 and/or for the third switching sequence S3. This is shown by way of example in FIGS. 4F to 4H.

Figure 4F:

In the case of the second switching sequence S2 in accordance with FIG. 4F, the second half-bridge 14 is switched into its second half-bridge position 14-2 periodically during each first pulse duration P1 of the first switching sequence S1 for a third pulse duration P3. In this case, the third pulse duration P3 is shorter than the first pulse duration P1. In the exemplary embodiment shown in FIG. 4F, the third pulse duration P3 between the instants t1 and t2, and between the instants t9 and t10, is approximately of half the length of the first pulse duration P1 of the first switching sequence S1. During the third pulse duration P3, the first electric motor 11 is driven in each case actively in the direction D1 of rotation by a current flow I1, as described above with reference to FIG. 4B. After the third pulse duration P3 has elapsed, at the instant t2 and respectively at the instant t10 (and at corresponding instants in the subsequent periods) the second half-bridge 14 is switched over into its high-impedance third half-bridge position 14-3. Shortly afterward, at the instant t3 and t11, respectively, a switchover into the first half-bridge position 14-1 is now effected. In this case, a switching offset between the instants t2 and t3 (and between the instants t10 and t11, etc.) serves for avoiding a half-bridge short circuit, as explained above with reference to the first switching sequence S1.

Afterward, the second half-bridge 14 remains in its first half-bridge position 14-1 until the end of the first pulse duration P1. In the phase between the instants t2 and t4, a freewheeling current can circulate in the counterclockwise direction through the first bridge branch 1-10, the third switching element 141 and the first switching element 131. Between the instants t3 and t4, the closed third switching element 141 here can enable an active freewheeling. Afterward, i.e. at the instant t4, the second half-bridge 14 (with a switching offset between the instants t4 and t5) is switched into its third half-bridge position 14-3 for the rest of the period duration T. Alternatively, the second half-bridge 14, as illustrated in FIG. 4H, can be switched into its second half-bridge position 14-2 at the instant t5 in order to enable an active freewheeling through the second bridge branch 1-20, the fourth switching element 142 and the second switching element 132 during the second pulse duration P2.

The rotational speed of the first electric motor 11 can be controlled by setting a ratio of the third pulse duration P3 of the second switching sequence S2 to the period duration T of the first switching sequence S1 in a range of from 0 to the ratio between the first pulse duration P1 and the period duration T. In this case, the rotational speed of the first electric motor 11 is all the greater, the greater the ratio of the third pulse duration P3 to the period duration T since on average over time over a plurality of period durations T the current flow I1 is substantially proportional to the ratio of the third pulse duration P3 to the period duration T.

In order to drive the first electric motor 11 in the opposite direction D2 of rotation, in a further variant of the second switching sequence S2 (not illustrated), the second half-bridge 14 can be switched periodically into its first half-bridge position 14-1 in such a way that the second half-bridge 14 adopts the first half-bridge position 14-1 at least for a fourth pulse duration P4, during which the first half-bridge 13 is in its second half-bridge position 13-2. In this case, the first electric motor 11 is driven in the opposite direction D2 of rotation for the fourth pulse duration P4 by a current flow I2 from the second motor contact 112 to the first motor contact 111. Details of the functioning of the drive here are to be understood entirely analogously to the description given above with reference to the drive in the first direction D1 of rotation. In this case, the rotational speed of the first electric motor 11 can in turn be controlled by setting a ratio of the fourth pulse duration P4 to the period duration T.

Figure 4G:
Figure 4H:
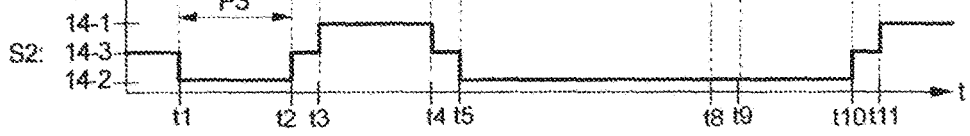

FIG. 4G shows an excerpt from a third switching sequence S3 for driving the second electric motor 12 in the direction D3 of rotation. Here the third half-bridge 15 is switched into its first half-bridge position 15-1 periodically in each case for a fifth pulse duration P5, while the first half-bridge 13 is in its second half-bridge position 13-2 for the first pulse duration P2. The second electric motor 12 is driven in the direction D3 of rotation in each case for the fifth pulse duration P5, i.e. for example between the instants t5 and t6, by the current flow I3 from the third motor contact 121 to the fourth motor contact 122.

Between the instants t6 and t8 the second electric motor 2 can drive a freewheeling current in the counterclockwise direction through the second bridge branch 1-20, the second switching element 132 and the sixth switching element 152, wherein an active freewheeling is made possible by the closed sixth switching element 152 from the instant t7 to the instant t8. In one variant (not illustrated), an active freewheeling can also be made possible during the subsequent first pulse duration P1 by the switching of the third half-bridge 15 into its first half-bridge position 15-1.

In order to drive the second electric motor 12 in the opposite direction D4 of rotation, in a further variant of the third switching sequence S3 (not illustrated), the third half-bridge can be switched periodically into its second half-bridge position 15-2, such that the third half-bridge 15 adopts the second half-bridge position 15-2 at least for a sixth pulse duration P6, during which the first half-bridge 13 is in its first half-bridge position 13-1. In this case, the second electric motor 12 is driven in the opposite direction D4 of rotation for the sixth pulse duration P6 by a current flow I4 from the fourth motor contact 122 to the third motor contact 121. In this case, the rotational speed of the second electric motor 12 can be controlled by setting a ratio of the sixth pulse duration P6 to the period duration T.

The above-described second switching sequences S2 for the second half-bridge 14, on the one hand, and third switching sequences S3 for the third half-bridge 15, on the other hand, can be used sequentially or simultaneously in order to drive the first electric motor 11 and the second electric motor 12 successively or simultaneously with a desired rotational speed in a desired direction D1, D2, D3, D4 of rotation.

It lies within the scope of the invention that the electric arrangement 1, over and above the first electric motor 11 and the second electric motor 12, can comprise further electric motors with an assigned further half-bridge in each case. The further half-bridges can in each case comprise at least two further switching elements. Here each of the further electric motors can be arranged in each case in a further bridge branch which together with the first half-bridge 13 and the further half-bridge assigned to the further electric motor forms a further H-bridge arrangement. In this case, a respective one of the further electric motors can be controlled analogously to the above-described method by the switching of the first and/or second switching element 131, 132 of the first half-bridge 13 and of the further switching elements of the respectively assigned further half-bridge. In this way, by means of the electric arrangement 1 it is also possible to drive more than two electric motors simultaneously with in each case a desired rotational speed in a desired direction of rotation in each case.

In particular, in a window winding device for a motor vehicle, at a left front windowpane, at a right front windowpane, at a left rear windowpane and at a right rear windowpane, it is possible to arrange a respective electric motor as adjusting motor for adjusting the respective windowpane. The four electric motors can be arranged in the above-described manner in an electric arrangement 1 according to the invention. By means of the electric arrangement 1, the four adjusting motors can be controlled independently of one another for raising or lowering the respective windowpane.

LIST OF REFERENCE SIGNS

1 Electric arrangement
1-1 First H-bridge arrangement
1-10 First bridge branch
1-2 Second H-bridge arrangement
1-20 Second bridge branch
11 First electric motor
111 First motor contact
112 Second motor contact 12 Second electric motor
121 Third motor contact
122 Fourth motor contact
13 First half-bridge
131 First switching element
132 Second switching element
13-1 First half-bridge position
13-2 Second half-bridge position
13-3 Third half-bridge position
14 Second half-bridge
141 Third switching element
142 Fourth switching element
14-1 First half-bridge position
14-2 Second half-bridge position
14-3 Third half-bridge position
15 Third half-bridge
151 Fifth switching element
152 Sixth switching element
15-1 First half-bridge position
15-2 Second half-bridge position
15-3 Third half-bridge position
18 First supply terminal
19 Second supply terminal
2 Electric arrangement in accordance with the prior art
2-1 First H-bridge arrangement
2-10 First bridge branch
2-2 Second H-bridge arrangement
2-20 Second bridge branch
21 First electric motor
211 First motor contact
212 Second motor contact
22 Second electric motor
221 Third motor contact
222 Fourth motor contact
23 First half-bridge
231 First switching element
232 Second switching element
23-1 First half-bridge position
23-2 Second half-bridge position
23-3 Third half-bridge position
24 Second half-bridge
241 Third switching element
242 Fourth switching element
24-1 First half-bridge position
24-2 Second half-bridge position
24-3 Third half-bridge position
25 Third half-bridge
251 Fifth switching element
252 Sixth switching element
25-1 First half-bridge position
25-2 Second half-bridge position
25-3 Third half-bridge position
26 Fourth half-bridge
261 Seventh switching element
262 Eighth switching element
26-1 First half-bridge position
26-2 Second half-bridge position
26-3 Third half-bridge position
28 First supply terminal
29 Second supply terminal
30 Control unit
D1, D2, D3, D4 Directions of rotation
P1 First pulse duration
P2 Second pulse duration
P3 Third pulse duration
P4 Fourth pulse duration
P5 Fifth pulse duration
P6 Sixth pulse duration
S1 First switching sequence
S2 Second switching sequence
S3 Third switching sequence
T Period duration
t Time
t1-t11 Instants
V Supply voltage
V1 First potential
V2 Second potential

The invention claimed is:
1. A method for controlling at least two electric motors using an electric arrangement which, for controlling the electric motors, has at least one first H-bridge arrangement and a second H-bridge arrangement, wherein the electric arrangement comprises the following:
a first electric motor which is arranged in a first bridge branch of the first H-bridge arrangement and is electrically connected to a first half-bridge and a second half-bridge in the first H-bridge arrangement and
a second electric motor, which is arranged in a second bridge branch of the second H-bridge arrangement and is electrically connected to the first half-bridge and a third half-bridge in the second H-bridge arrangement,
wherein each of the half-bridges comprises at least two switching elements,
wherein
the first electric motor is controlled by the switching of the switching elements of the first half-bridge and of the second half-bridge, and/or
the second electric motor is controlled by the switching of the switching elements of the first half-bridge and of the third half-bridge,
wherein
each of the half-bridges is electrically connected to a first supply terminal and to a second supply terminal and is switchable in each case into a first half-bridge position, into a second half-bridge position, and into a third half-bridge position,
wherein:
in the first half-bridge position, one of the switching elements which is arranged within the respective half-bridge in an electric path between the first supply terminal and the respective other one of the switching elements is closed, while the other one of the switching elements is open,
in the second half-bridge position, one of the switching elements which is arranged within the respective half-bridge in an electrical path between the second supply terminal and the respective other one of the switching elements is closed, while the other one of the switching elements is open, and
in the third half-bridge position, the switching elements of the respective half-bridge are open,
wherein,
for controlling the electric motors, the first half-bridge, in a first switching sequence, is switched periodically into the first half-bridge position in each case for a first pulse duration and into the second half-bridge position in each case for a second pulse duration and the second half-bridge and/or the third half-bridge, are/is switched depending on the respective first or second electric motor to be controlled,
and wherein
a ratio of the first pulse duration to the second pulse duration is in the range of 0.9 to 1.1.

2. The method according to claim 1, wherein the second half-bridge
- is switched into its second half-bridge position for a plurality of period durations of the first switching sequence in order to drive the first electric motor in one direction of rotation, and/or
- is switched into its first half-bridge position for a plurality of period durations of the first switching sequence in order to drive the first electric motor in an opposite direction of rotation, and/or wherein the third half-bridge
- is switched into its first half-bridge position for a plurality of period durations of the first switching sequence in order to drive the second electric motor in one direction of rotation, and/or
- is switched into its second half-bridge position for a plurality of period durations of the first switching sequence in order to drive the second electric motor in an opposite direction of rotation.

3. The method according to claim 1, wherein the second half-bridge
- in order to drive the first electric motor in one direction of rotation is switched periodically into its second half-bridge position and is in its second half-bridge position in each case at least for a third pulse duration, during which the first half-bridge is in its first half-bridge position, and/or
- in order to drive the first electric motor in an opposite direction of rotation is switched periodically into its first half-bridge position and is in its first half-bridge position in each case at least for a fourth pulse duration, during which the first half-bridge is in its second half-bridge position, and/or wherein the third half-bridge
- in order to drive the second electric motor in one direction of rotation is switched periodically into its first half-bridge position and adopts the latter in each case at least for a fifth pulse duration, during which the first half-bridge is in its second half-bridge position, and/or
- in order to drive the second electric motor in an opposite direction of rotation is switched periodically into its second half-bridge position and adopts the latter in each case at least for a sixth pulse duration, during which the first half-bridge is in its first half-bridge position.

4. The method according to claim 1, wherein in order to enable an active freewheeling, at least one of:
- the second half-bridge is switched periodically into the first or the second half-bridge position thereof and the second half-bridge remains in the respective position while the first half-bridge is in its first half-bridge position, or
- the third half-bridge is switched periodically into the first or the second half-bridge position thereof and remains in the respective position while the first half-bridge is in its second half-bridge position.

5. The method according to claim 3, wherein a rotational speed of the first electric motor is controlled by setting a ratio of the third pulse duration and/or the fourth pulse duration to a period duration of the first switching sequence, and/or in that a rotational speed of the second electric motor is controlled by setting a ratio of the fifth pulse duration and/or the sixth pulse duration to the period duration of the first switching sequence.

6. A method for controlling at least two electric motors using an electric arrangement which, for controlling the electric motors, has at least one first H-bridge arrangement and a second H-bridge arrangement, wherein the electric arrangement comprises the following:
- a first electric motor which is arranged in a first bridge branch of the first H-bridge arrangement and is electrically connected to a first half-bridge and a second half-bridge in the first H-bridge arrangement and
- a second electric motor, which is arranged in a second bridge branch of the second H-bridge arrangement and is electrically connected to the first half-bridge and a third half-bridge in the second H-bridge arrangement,
- wherein each of the half-bridges comprises at least two switching elements, wherein
- the first electric motor is controlled by the switching of the switching elements of the first half-bridge and of the second half-bridge, and/or
- the second electric motor is controlled by the switching of the switching elements of the first half-bridge and of the third half-bridge, wherein
- each of the half-bridges is electrically connected to a first supply terminal and to a second supply terminal and is switchable in each case into a first half-bridge position, into a second half-bridge position and into a third half-bridge position, wherein
- in the first half-bridge position that one of the switching elements which is arranged within the respective half-bridge in an electric path between the first supply terminal and the respective other one of the switching elements is closed, while the other one of the switching elements is open,
- in the second half-bridge position that one of the switching elements which is arranged within the respective half-bridge in an electrical path between the second supply terminal and the respective other one of the switching elements is closed, while the other one of the switching elements is open, and
- in the third half-bridge position the switching elements of the respective half-bridge are open, wherein,
- for controlling the electric motors, the first half-bridge, in a first switching sequence, is switched periodically into the first half-bridge position in each case for a first pulse duration and into the second half-bridge position in each case for a second pulse duration and the second half-bridge and/or the third half-bridge are/is switched depending on the respective first or second electric motor to be controlled, and wherein
- a ratio of the first pulse duration to a period duration of the first switching sequence and/or
- a ratio of the second pulse duration to the period duration of the first switching sequence are/is in the range of 0.4 to 0.6.

7. The method according to claim 6, wherein the second half-bridge
- is switched into its second half-bridge position for a plurality of period durations of the first switching sequence in order to drive the first electric motor in one direction of rotation, and/or
- is switched into its first half-bridge position for a plurality of period durations of the first switching sequence in order to drive the first electric motor in an opposite direction of rotation, and/or wherein the third half-bridge is switched into its first half-bridge position for a plurality of period durations of the first switching sequence in order to drive the second electric motor in one direction of rotation, and/or is switched into its second half-bridge position for a plurality of period durations of the first switching sequence in order to drive the second electric motor in an opposite direction of rotation.

8. The method according to claim 6, wherein the second half-bridge in order to drive the first electric motor in one direction of rotation is switched periodically into its second half-bridge position and adopts the latter in each case at least for a third pulse duration, during which the first half-bridge is in its first half-bridge position, and/or in order to drive the first electric motor in an opposite direction of rotation is switched periodically into its first half-bridge position and adopts the latter in each case at least for a fourth pulse duration, during which the first half-bridge is in its second half-bridge position, and/or wherein the third half-bridge in order to drive the second electric motor in one direction of rotation is switched periodically into its first half-bridge position and is in its first half-bridge position in each case at least for a fifth pulse duration, during which the first half-bridge is in its second half-bridge position, and/or in order to drive the second electric motor in an opposite direction of rotation is switched periodically into its second half-bridge position and is in its second half-bridge position in each case at least for a sixth pulse duration, during which the first half-bridge is in its first half-bridge position.

9. The method according to claim 6, wherein in order to enable an active freewheeling, at least one of:

the second half-bridge is switched periodically into the first or the second half-bridge position thereof and the second half-bridge remains in the respective position while the first half-bridge is in its first half-bridge position, or the third half-bridge is switched periodically into the first or the second half-bridge position thereof and remains in the respective position while the first half-bridge is in its second half-bridge position.

10. The method according to claim 8, wherein a rotational speed of the first electric motor is controlled by setting a ratio of the third pulse duration and/or the fourth pulse duration to a period duration of the first switching sequence, and/or in that a rotational speed of the second electric motor is controlled by setting a ratio of the fifth pulse duration and/or the sixth pulse duration to the period duration of the first switching sequence.

11. A method for controlling at least two electric motors using an electric arrangement which, for controlling the electric motors, has at least one first H-bridge arrangement and a second H-bridge arrangement, wherein the electric arrangement comprises the following:

a first electric motor which is arranged in a first bridge branch of the first H-bridge arrangement and is electrically connected to a first half-bridge and a second half-bridge in the first H-bridge arrangement and a second electric motor, which is arranged in a second bridge branch of the second H-bridge arrangement and is electrically connected to the first half-bridge and a third half-bridge in the second H-bridge arrangement, wherein each of the half-bridges comprises at least two switching elements, wherein the first electric motor is controlled by the switching of the switching elements of the first half-bridge and of the second half-bridge, and/or the second electric motor is controlled by the switching of the switching elements of the first half-bridge and of the third half-bridge, wherein each of the half-bridges is electrically connected to a first supply terminal and to a second supply terminal and is switchable in each case into a first half-bridge position, into a second half-bridge position and into a third half-bridge position, wherein in the first half-bridge position that one of the switching elements which is arranged within the respective half-bridge in an electric path between the first supply terminal and the respective other one of the switching elements is closed, while the other one of the switching elements is open, in the second half-bridge position that one of the switching elements which is arranged within the respective half-bridge in an electrical path between the second supply terminal and the respective other one of the switching elements is closed, while the other one of the switching elements is open, and in the third half-bridge position the switching elements of the respective half-bridge are open, wherein for switching over the half-bridges from their respective first half-bridge position into their respective second half-bridge position, the respective half-bridge is firstly switched from its first half-bridge position into its third half-bridge position and is subsequently switched from its third half-bridge position into its second half-bridge position, and for switching over the half-bridges from their respective second half-bridge position into their respective first half-bridge position, the respective half-bridge is firstly switched from its second half-bridge position into its third half-bridge position and is subsequently switched from its third half-bridge position into its first half-bridge position.

12. The method according to claim 11, wherein, for controlling the electric motors, the first half-bridge, in a first switching sequence, is switched periodically into the first half-bridge position in each case for a first pulse duration and into the second half-bridge position in each case for a second pulse duration and the second half-bridge and/or the third half-bridge are/is switched depending on the respective first or second electric motor to be controlled.

13. The method according to claim 11, wherein in order to enable an active freewheeling, at least one of:

the second half-bridge is switched periodically into the first or the second half-bridge position thereof and the second half-bridge remains in the respective position while the first half-bridge is in its first half-bridge position, or the third half-bridge is switched periodically into the first or the second half-bridge position thereof and remains in the respective position while the first half-bridge is in its second half-bridge position.

14. The method according to claim 12, wherein the second half-bridge
- is switched into its second half-bridge position for a plurality of period durations of the first switching sequence in order to drive the first electric motor in one direction of rotation, and/or
- is switched into its first half-bridge position for a plurality of period durations of the first switching sequence in order to drive the first electric motor in an opposite direction of rotation, and/or wherein the third half-bridge
- is switched into its first half-bridge position for a plurality of period durations of the first switching sequence in order to drive the second electric motor in one direction of rotation, and/or
- is switched into its second half-bridge position for a plurality of period durations of the first switching sequence in order to drive the second electric motor in an opposite direction of rotation.

15. The method according to claim 12, wherein the second half-bridge
- in order to drive the first electric motor in one direction of rotation is switched periodically into its second half-bridge position and is in its second half-bridge position in each case at least for a third pulse duration, during which the first half-bridge is in its first half-bridge position, and/or
- in order to drive the first electric motor in an opposite direction of rotation is switched periodically into its first half-bridge position and is in its first half-bridge position in each case at least for a fourth pulse duration, during which the first half-bridge is in its second half-bridge position, and/or wherein the third half-bridge
- in order to drive the second electric motor in one direction of rotation is switched periodically into its first half-bridge position and is in its first half-bridge position in each case at least for a fifth pulse duration, during which the first half-bridge is in its second half-bridge position, and/or
- in order to drive the second electric motor in an opposite direction of rotation is switched periodically into its second half-bridge position and is in its second half-bridge position in each case at least for a sixth pulse duration, during which the first half-bridge is in its first half-bridge position.

16. The method according to claim 15, wherein a rotational speed of the first electric motor is controlled by setting a ratio of the third pulse duration and/or the fourth pulse duration to a period duration of the first switching sequence, and/or in that a rotational speed of the second electric motor is controlled by setting a ratio of the fifth pulse duration and/or the sixth pulse duration to the period duration of the first switching sequence.

17. An electric arrangement which, for controlling the electric motors, has at least one first H-bridge arrangement and a second H-bridge arrangement, wherein the electric arrangement comprises the following:
- a first electric motor which is arranged in a first bridge branch of the first H-bridge arrangement and is electrically connected to a first half-bridge and a second half-bridge in the first H-bridge arrangement and
- a second electric motor, which is arranged in a second bridge branch of the second H-bridge arrangement and is electrically connected to the first half-bridge and a third half-bridge in the second H-bridge arrangement,
- wherein each of the half-bridges comprises at least two switching elements, wherein the electric arrangement further comprises a control unit which is configured for generating control signals for the switching elements depending on at least one of a desired direction of rotation or rotational speed for at least one of the first electric motor or the second electric motor in such a way that:
- the first electric motor is controlled by the switching of the switching elements of the first half-bridge and of the second half-bridge, and/or
- the second electric motor is controlled by the switching of the switching elements of the first half-bridge and of the third half-bridge, wherein
- each of the half-bridges is electrically connected to a first supply terminal and to a second supply terminal and is switchable in each case into a first half-bridge position, into a second half-bridge position and into a third half-bridge position, wherein
- in the first half-bridge position that one of the switching elements which is arranged within the respective half-bridge in an electric path between the first supply terminal and the respective other one of the switching elements is closed, while the other one of the switching elements is open,
- in the second half-bridge position that one of the switching elements which is arranged within the respective half-bridge in an electrical path between the second supply terminal and the respective other one of the switching elements is closed, while the other one of the switching elements is open, and
- in the third half-bridge position the switching elements of the respective half-bridge are open, wherein,
- for controlling the electric motors, the control unit is configured for switching the first half-bridge, in a first switching sequence, periodically into the first half-bridge position in each case for a first pulse duration and into the second half-bridge position in each case for a second pulse duration and for switching the second half-bridge and/or the third half-bridge depending on the respective first or second electric motor to be controlled, wherein
- a ratio of the first pulse duration to the second pulse duration is in the range of 0.9 to 1.1.

18. An electric arrangement which, for controlling the electric motors, has at least one first H-bridge arrangement and a second H-bridge arrangement, wherein the electric arrangement comprises the following:
- a first electric motor which is arranged in a first bridge branch of the first H-bridge arrangement and is electrically connected to a first half-bridge and a second half-bridge in the first H-bridge arrangement and
- a second electric motor, which is arranged in a second bridge branch of the second H-bridge arrangement and is electrically connected to the first half-bridge and a third half-bridge in the second H-bridge arrangement,
- wherein each of the half-bridges comprises at least two switching elements, wherein the electric arrangement further comprises a control unit which is configured for generating control signals for the switching elements depending on at least one of a desired direction of rotation or rotational speed for at least one of the first electric motor or the second electric motor in such a way that:
- the first electric motor is controlled by the switching of the switching elements of the first half-bridge and of the second half-bridge, and/or
- the second electric motor is controlled by the switching of the switching elements of the first half-bridge and of the third half-bridge, wherein
- each of the half-bridges is electrically connected to a first supply terminal and to a second supply terminal and is switchable in each case into a first half-bridge position, into a second half-bridge position and into a third half-bridge position, wherein
- in the first half-bridge position that one of the switching elements which is arranged within the respective half-bridge in an electric path between the first supply terminal and the respective other one of the switching elements is closed, while the other one of the switching elements is open,
- in the second half-bridge position that one of the switching elements which is arranged within the respective half-bridge in an electrical path between the second supply terminal and the respective other one of the switching elements is closed, while the other one of the switching elements is open, and
- in the third half-bridge position the switching elements of the respective half-bridge are open, wherein,
- for controlling the electric motors, the control unit is configured for switching the first half-bridge, in a first switching sequence, periodically into the first half-bridge position in each case for a first pulse duration and into the second half-bridge position in each case for a second pulse duration and for switching the second half-bridge and/or the third half-bridge depending on the respective first or second electric motor to be controlled, wherein
- a ratio of the first pulse duration to a period duration of the first switching sequence and/or
- a ratio of the second pulse duration to the period duration of the first switching sequence are/is in the range of 0.4 to 0.6.

19. An electric arrangement which, for controlling the electric motors, has at least one first H-bridge arrangement and a second H-bridge arrangement, wherein the electric arrangement comprises the following:
- a first electric motor which is arranged in a first bridge branch of the first H-bridge arrangement and is electrically connected to a first half-bridge and a second half-bridge in the first H-bridge arrangement and
- a second electric motor, which is arranged in a second bridge branch of the second H-bridge arrangement and is electrically connected to the first half-bridge and a third half-bridge in the second H-bridge arrangement,
wherein each of the half-bridges comprises at least two switching elements,
wherein the electric arrangement further comprises a control unit which is configured for generating control signals for the switching elements depending on at least one of a desired direction of rotation or rotational speed for at least one of the first electric motor or the second electric motor in such a way that:
- the first electric motor is controlled by the switching of the switching elements of the first half-bridge and of the second half-bridge, and/or
- the second electric motor is controlled by the switching of the switching elements of the first half-bridge and of the third half-bridge, wherein
- each of the half-bridges is electrically connected to a first supply terminal and to a second supply terminal and is switchable in each case into a first half-bridge position, into a second half-bridge position and into a third half-bridge position, wherein
- in the first half-bridge position that one of the switching elements which is arranged within the respective half-bridge in an electric path between the first supply terminal and the respective other one of the switching elements is closed, while the other one of the switching elements is open,
- in the second half-bridge position that one of the switching elements which is arranged within the respective half-bridge in an electrical path between the second supply terminal and the respective other one of the switching elements is closed, while the other one of the switching elements is open, and
- in the third half-bridge position the switching elements of the respective half-bridge are open, wherein the control unit is configured for providing the control signals such that:
- for switching over the half-bridges from their respective first half-bridge position into their respective second half-bridge position, the respective half-bridge is firstly switched from its first half-bridge position into its third half-bridge position and is subsequently switched from its third half-bridge position into its second half-bridge position, and
- for switching over the half-bridges from their respective second half-bridge position into their respective first half-bridge position, the respective half-bridge is firstly switched from its second half-bridge position into its third half-bridge position and is subsequently switched from its third half-bridge position into its first half-bridge position.

\* \* \* \* \*

UNITED STATES PATENT AND TRADEMARK OFFICE
CERTIFICATE OF CORRECTION

PATENT NO. : 10,090,785 B2  
APPLICATION NO. : 15/293206  
DATED : October 2, 2018  
INVENTOR(S) : Thomas Schindhelm et al.

Page 1 of 1

It is certified that error appears in the above-identified patent and that said Letters Patent is hereby corrected as shown below:

On the Title Page  
Item (73), Assignee, Line 2     delete "Fahrzeugtelle"  
                                                  insert -- Fahrzeugteile --

In the Claims  
Column 18, Line 62, Claim 1     delete "half-bridge,"  
                                                  insert -- half-bridge --

Signed and Sealed this  
Seventeenth Day of September, 2019

Andrei Iancu  
*Director of the United States Patent and Trademark Office*